(12) United States Patent
Zhang et al.

(10) Patent No.: US 11,313,668 B2
(45) Date of Patent: Apr. 26, 2022

(54) COMPRESSED ULTRAFAST IMAGING VELOCITY INTERFEROMETER SYSTEM FOR ANY REFLECTOR

(71) Applicant: East China Normal University, Shanghai (CN)

(72) Inventors: Shi'an Zhang, Shanghai (CN); Dalong Qi, Shanghai (CN); Chengzhi Jin, Shanghai (CN); Yilin He, Shanghai (CN); Chengshuai Yang, Shanghai (CN); Fengyan Cao, Shanghai (CN); Yunhua Yao, Shanghai (CN); Yan Yang, Shanghai (CN); Zhenrong Sun, Shanghai (CN)

(73) Assignee: East China Normal University, Shanghai (CN)

( * ) Notice: Subject to any disclaimer, the term of this patent is extended or adjusted under 35 U.S.C. 154(b) by 0 days.

(21) Appl. No.: 17/223,379

(22) Filed: Apr. 6, 2021

(65) Prior Publication Data

US 2021/0310786 A1 Oct. 7, 2021

(30) Foreign Application Priority Data

Apr. 7, 2020 (CN) .......................... 202010263257.1

(51) Int. Cl.
*G01B 9/02015* (2022.01)
*G01B 9/02* (2022.01)
(Continued)

(52) U.S. Cl.
CPC ......... *G01B 9/0203* (2013.01); *G01B 9/0209* (2013.01); *G01B 9/02045* (2013.01);
(Continued)

(58) Field of Classification Search
CPC ... G01J 11/00; G01J 2011/005; G01B 9/0203; G01B 9/02045; G01B 9/0209; G01B 2290/25
See application file for complete search history.

(56) References Cited

U.S. PATENT DOCUMENTS

2015/0331004 A1\* 11/2015 Ghai .................. G01P 3/36
356/28.5
2017/0163971 A1\* 6/2017 Wang .................. G01S 17/10
(Continued)

FOREIGN PATENT DOCUMENTS

CN 106952668 A \* 7/2017

OTHER PUBLICATIONS

Arrigoni, M. et al. "Laser Doppler interferometer based on a solid Fabry-Perot etalon for measurement of surface velocity in shock experiments". Measurement Science and Technology, 20(1), Dec. 8, 2008, pp. 1-7. (Year: 2008).\*

(Continued)

*Primary Examiner* — Michael A Lyons
(74) *Attorney, Agent, or Firm* — Kim IP Law Group LLC

(57) ABSTRACT

The present disclosure provides a compressed ultrafast imaging velocity interferometer system for any reflector, comprising a light source and target system, an etalon interference system, a compressed ultrafast imaging system, a timing control system and a data processing system. An imaging device in the traditional imaging velocity interferometer system for any reflector is replaced by a compressed ultrafast imaging system, a compressed ultrafast Photography (CUP) is introduced in an imaging process, multi-frame images, i.e. three-dimensional images for two-dimensional space and one-dimensional time, are reconstructed via a single measurement by a CUP-VISAR two-dimensional ultrafast dynamic image imaging, a complete dynamic process of a two-dimensional interference fringes image is (Continued)

restored, and spatiotemporal evolution information of a shock wave is effectively acquired, improving an imaging performance of the imaging velocity interferometer system for any reflector in dimension, and achieving a goal that could not be achieved before.

1 Claim, 5 Drawing Sheets

(51) Int. Cl.
 *G01B 9/0209* (2022.01)
 *G01J 11/00* (2006.01)

(52) U.S. Cl.
 CPC .......... *G01J 11/00* (2013.01); *G01B 2290/25* (2013.01); *G01J 2011/005* (2013.01)

(56) References Cited

U.S. PATENT DOCUMENTS

2020/0288110 A1* 9/2020 Wang .................. H04N 13/282
2021/0088384 A1* 3/2021 Wang ..................... G01S 17/89

OTHER PUBLICATIONS

Weining, Wang et al. "Accuracy examination of shock speed measurement by imaging velocity interferometer system for any reflector". High Power Laser and Particle Beams, vol. 24, No. 9, Sep. 2012, pp. 2121-2124. (Year: 2012).*

Fajardo, Mario et al. "Coherent optical transients observed in rubidium atomic line filtered Doppler velocimetry experiments". Journal of Applied Physics, 118, Oct. 8, 2015, pp. 144901-1-144901-12. (Year: 2015).*

Labaria, George R. et al. "A robust in-situ warp-correction algorithm for VISAR streak camera data at the National Ignition Facility". High Power Lasers for Fusion Research III, Proc. of SPIE vol. 9345, 2015, pp. 93450Q-1-93450Q-15. (Year: 2015).*

Wu, Yuji et al. "A high temporal resolution numerical algorithm forshock wave velocity diagnosis". Scientific Reports 9, 8597, Jun. 13, 2019, pp. 1-8. (Year: 2019).*

* cited by examiner

COMPRESSED ULTRAFAST IMAGING VELOCITY INTERFEROMETER SYSTEM FOR ANY REFLECTOR

CROSS REFERENCE TO RELATED APPLICATION

This application claims the benefit of priority of Chinese Patent Application No. 202010263257.1, entitled "Compressed Ultrafast Imaging Velocity Interferometer System for Any Reflector" filed with the China National Intellectual Property Administration on Apr. 7, 2020, which is incorporated herein by reference in its entirety.

TECHNICAL FIELD

The present disclosure relates to a technical field of optically recording velocity interferometer system, in particular to a compressed ultrafast imaging velocity interferometer system for any reflector.

BACKGROUND

In research for laser Inertial Confinement Fusion (ICF), technologies for diagnosing shock wave velocity mainly include a passive shock wave diagnostic technology and an active shock wave diagnostic technology. Wherein, the passive shock wave diagnosis technology is a simple and direct diagnosis technology with limited use occasions, in which fluorescence generated when the shock wave breaks through a sample interface is detected to obtain an average transit velocity between steps by a design of step target. According to the active shock wave diagnosis technology, a probe light is actively input, a velocity history of a surface to be detected is obtained based on beat frequency information carried by the probe light being reflected on the interface to be detected and a Doppler frequency shift principle, physical state information such as pressure or temperature within a sample can be obtained based on the velocity history of the shock wave, and position and shape information of a wavefront of the shock wave can be obtained by a simple integral calculation. Since the information obtained by using the active shock wave diagnosis technology is more abundant and can be applied to various sample structures, such as solid and liquid structures, the active shock wave diagnosis technology becomes an important diagnosis technology in a research for shock wave speed regulation and high-pressure physical state response. At present, an imaging velocity interferometer system for any reflector (VISAR) has become a standard precise active shock wave diagnosis technology. In recent years, researches for imaging VISAR are carried out in succession in domestic academies of sciences, colleges, and universities.

In order to break through the limitation that a linear imaging VISAR can only diagnose a velocity on one line of the wavefront of the shock wave, a two-dimensional structure of a VISAR based on a gated CCD for recording, namely a planar imaging VISAR, is reported in 2010, which can record a shape and details of a velocity field of the wavefront of the shock wave at a certain moment, and also has an important potential in ICF hydrodynamic instability and mixed effect research due to a diagnostic ability for a micro-disturbance on a shock wave surface. However, the two-dimensional structure still has a limitation that only a morphology for the velocity field of the shock wave at a certain time can be detected, i.e., a single frame image can be obtained, but cannot be observed in real time, which results in a loss of a large amount of information so that a complete dynamic process of interference fringes is difficult to be restored, and thus a detection of the laser ICF cannot be met.

A traditional imaging VISAR is influenced by an imaging device, when the imaging device is an area array CCD, only one frame of two-dimensional image can be obtained during a single measurement; when the imaging device is a streak camera, only multi-frame one-dimensional images can be obtained during a single measurement. However, target shooting is a transient change process with an extremely short time period, which can be measured only once and cannot be measured repeatedly. Therefore, whether the one frame of two-dimensional image is obtained or multi-frame one-dimensional images are obtained, the whole change process of the transient process, when implosion in laser ICF occurs under an action of a strong laser, cannot be reversely deduced as the obtained information is limited, which is not beneficial to a corresponding pulse shaping for the strong laser for targeting, and restricts an improvement of the targeting efficiency. Therefore, a development of a two-dimensional ultrafast dynamic imaging VISAR is a key scientific and technical issue which is urgently needed to be solved for precision diagnosis of laser ICF shock wave, and is also a key step for a program of National Ignition Campaign at present.

SUMMARY

The present disclosure intends to provide a compressed ultrafast imaging VISAR to overcome defects of the prior art, which comprises a light source and target system, an etalon interference system, a compressed ultrafast imaging system, a timing control system and a data processing system. According to the disclosure, the imaging device in the traditional imaging VISAR is replaced by the compressed ultrafast imaging system, a compressed ultrafast photography (CUP) is introduced in the imaging process, multi-frame images, i.e., three-dimensional images for two-dimensional space and one-dimensional time, are reconstructed via a single measurement by CUP-VISAR, a two-dimensional ultrafast dynamic imaging, a complete dynamic process of a two-dimensional interference fringe image is restored, and spatiotemporal evolution information of the shock wave is effectively acquired, improving an imaging performance of the imaging VISAR in dimension, and achieving a goal that could not be achieved before.

The specific technical solutions for achieving the above effect are as follows:

a compressed ultrafast imaging VISAR, comprising a light source and target system (100), an etalon interference system (200), a compressed ultrafast imaging system (300), a timing control system (400) and a data processing system (500);

wherein, the light source and target system (100) comprises a nanosecond laser (1), a first convex lens (2), a first beam splitter (3), a second convex lens (4), a third convex lens (5), a quartz glass sheet (6), a target (7) and a fourth convex lens (8); wherein the nanosecond laser (1), the first convex lens (2) and the first beam splitter (3) are successively coupled on an optical path; a laser pulse generated by the nanosecond laser (1) passes through the first convex lens (2), is transmitted by the first beam splitter (3), then passes through the second convex lens (4), the third convex lens (5) and the quartz glass sheet (6), and then irradiates on the target (7) to form a signal scene via a reflection; the signal scene passes through the quartz glass sheet (6), the third convex lens (5), the second convex lens (4) again and then is reflected by the first beam splitter (3) to reach the fourth convex lens (8);

the etalon interference system (200) comprises a second beam splitter (9), an etalon (10), a holophote (11) and a third beam splitter (12); wherein an optical path is split into two paths by the second beam splitter (9), the etalon (10) is coupled on one of the two paths, and the holophote (11) is coupled on the other of the two paths; and the etalon (10) and the holophote (11) are respectively coupled with the third beam splitter (12) on an optical path;

the compressed ultrafast imaging system (300) comprises a fifth convex lens (13), a fourth beam splitter (14), a sixth convex lens (15), a digital micromirror device (16) and a streak camera (17); wherein the fifth convex lens (13) is coupled with the fourth beam splitter (14) on an optical path, and an optical path is split into two paths by the fourth beam splitter (14), wherein the sixth convex lens (15) and the digital micromirror device (16) are successively coupled on one of the two optical paths, and the streak camera (17) is coupled on the other of the two optical paths;

the timing control system (400) comprises a digital delay generator (18);

the data processing system (500) comprises a computer (19);

the fourth convex lens (8) of the light source and target system (100) is coupled with the second beam splitter (9) of the etalon interference system (200) on an optical path;

the nanosecond laser (1) of the light source and target system (100) is electrically connected with the digital delay generator (18) of the timing control system (400);

the target (7) of the light source and target system (100) is electrically connected with the digital delay generator (18) of the timing control system (400);

the third beam splitter (12) of the etalon interference system (200) is coupled with the fifth convex lens (13) of the compressed ultrafast imaging system (300) on an optical path;

the streak camera (17) of the compressed ultrafast imaging system (300) is electrically connected with the digital delay generator (18) of the timing control system (400) and the computer (19) of the data processing system (500), respectively; and the digital micromirror device (16) of the compressed ultrafast imaging system (300) is electrically connected with the computer (19) of the data processing system (500).

The compressed ultrafast imaging VISAR provided by the present disclosure includes a light source and target system, an etalon interference system, a compressed ultrafast imaging system, a timing control system and a data processing system. An imaging device in the traditional imaging VISAR is replaced by the compressed ultrafast imaging system, a compressed ultrafast photography (CUP) is introduced in the imaging process, multi-frame images, i.e. three-dimensional images for two-dimensional space and one-dimensional time, are reconstructed via a single measurement by a CUP-VISAR two-dimensional ultrafast dynamic image imaging, a complete dynamic process of a two-dimensional interference fringes image is restored, and spatiotemporal evolution information of the shock wave is effectively acquired, to improve an imaging performance of the imaging VISAR in dimension, and to achieve a goal that could not be achieved before.

The beneficial effects of the present disclosure are as follows:

According to the present disclosure, a compressed ultrafast photography (CUP) technology is introduced as an optical detection means in imaging VISAR, limitations of the existing linear imaging VISAR and planar imaging VISAR are broken through by performing a space coding, a data compression and an algorithm decoding on dynamic information of a two-dimensional fringe image, and complete dynamic information of the two-dimensional fringe image is obtained by a single shooting with a time resolution less than 800 femtoseconds, an imaging speed more than $1.25 \times 10^{12}$ frames/second, a dynamic space resolution less than 5 micrometers, a number of imaging frames more than 300 frames, and a speed uncertainty less than 2%. Therefore, a measurement precision of the imaging VISAR is greatly improved, and a basis is provided for laser pulse shaping during the inertial confinement fusion process, thereby an efficiency of the inertial confinement fusion is improved.

According to the present disclosure, using the compressed ultrafast photography as a detection means, the complete dynamic information of a target surface interference fringe image is restored by performing the space coding, a space-time compression and the algorithm decoding on the dynamic information of the target surface interference fringe image based on an advantage that multi-frame imaging can be in single shot by the compressed ultrafast photography, which greatly improves a time-space measurement precision of the imaging VISAR. The disclosure provides a powerful technical support for precise diagnosis of laser inertial confinement fusion for shock waves, and is expected to promote a rapid development of the program of National Ignition Campaign.

DETAILED DESCRIPTION OF THE EMBODIMENTS

Figure 1:
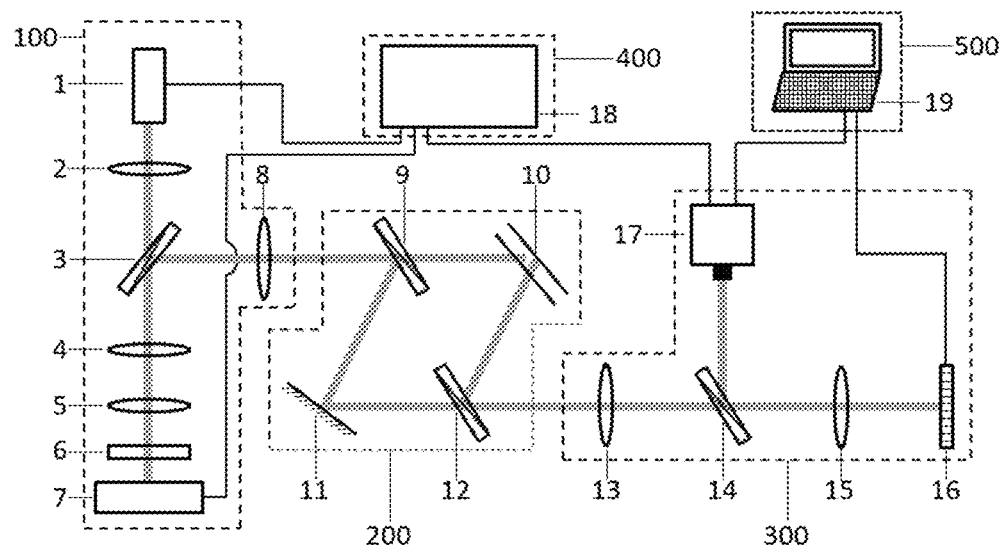
FIG. 1 is a schematic structural diagram of the present disclosure.

Referring to FIG. 1, the compressed ultrafast imaging VISAR provided by the present disclosure includes a light source and target system 100, an etalon interference system 200, a compressed ultrafast imaging system 300, a timing control system 400 and a data processing system 500.

Wherein, the light source and target system 100 includes a nanosecond laser 1, a first convex lens 2, a first beam splitter 3, a second convex lens 4, a third convex lens 5, a quartz glass sheet 6, a target 7 and a fourth convex lens 8. Wherein, the nanosecond laser 1, the first convex lens 2 and the first beam splitter 3 are successively coupled on an optical path. A laser pulse generated by the nanosecond laser (1) passes through the first convex lens (2), is transmitted by the first beam splitter (3), then passes through the second convex lens (4), the third convex lens (5) and the quartz glass sheet (6), and then irradiates on the target (7) to form a signal scene via a reflection. The signal scene passes through the quartz glass sheet (6), the third convex lens (5), the second convex lens (4) again and then is reflected by the first beam splitter (3) to reach the fourth convex lens (8).

Wherein, the etalon interference system 200 includes a second beam splitter 9, an etalon 10, a holophote 11 and a third beam splitter 12. Wherein, an optical path is split into two paths by the second beam splitter 9, where the etalon 10 is coupled on one of the two paths, and the holophote 11 is coupled on the other of the two paths. And the etalon 10 and the holophote 11 are respectively coupled with the third beam splitter 12 on an optical path.

Wherein, the compressed ultrafast imaging system 300 includes a fifth convex lens 13, a fourth beam splitter 14, a sixth convex lens 15, a digital micromirror device 16 and a streak camera 17. Wherein, the fifth convex lens 13 is coupled with the fourth beam splitter 14 in an optical path, and the optical path is split into two paths by the fourth beam splitter 14, wherein the sixth convex lens 15 and the digital micromirror device 16 are successively coupled on one of the two optical paths, and the streak camera 17 is coupled on the other of the two optical paths.

Wherein, the timing control system 400 includes a digital delay generator 18.

Wherein, the data processing system 500 includes a computer 19.

Wherein, the fourth convex lens 8 of the light source and target system 100 is coupled with the second beam splitter 9 of the etalon interference system 200 on an optical path.

Wherein, the nanosecond laser 1 of the light source and target system 100 is electrically connected with the digital delay generator 18 of the timing control system 400.

Wherein, the target 7 of the light source and target system 100 is electrically connected with the digital delay generator 18 of the timing control system 400.

Wherein, the third beam splitter 12 of the etalon interference system 200 is coupled with the fifth convex lens 13 of the compressed ultrafast imaging system 300 on an optical path.

Wherein, the streak camera 17 of the compressed ultrafast imaging system 300 is electrically connected with the digital delay generator 18 of the timing control system 400 and the computer 19 of the data processing system 500, respectively.

And the digital micromirror device 16 of the compressed ultrafast imaging system 300 is electrically connected with the computer 19 of the data processing system 500.

The compressed ultrafast imaging VISAR provided by the present disclosure operates as follows:

Referring to FIG. 1, after a laser pulse generated by the nanosecond laser 1 of the light source and target system 100 passing through the first convex lens 2, the first beam splitter 3, the second convex lens 4, the third convex lens 5 and the quartz glass sheet 6, the laser pulse irradiates on the target 7 to form a signal scene via a reflection. Then the signal scene passes through the quartz glass sheet 6, the third convex lens 5, the second convex lens 4 and the first beam splitter 3 again to be reflected by the first beam splitter 3 to reach the second beam splitter 9 of the etalon interference system 200 via the fourth convex lens 8, and is split into two beams by the second beam splitter 9, where one of the two beams is reflected to the third beam splitter 12 by the etalon 10, and the other of the two beams is reflected to a same position on the third beam splitter 12 through the holophote 11, to form a fringe signal scene via an interference. After the fringe signal scene passing through the fifth convex lens 13, the fourth beam splitter 14 and the sixth convex lens 15 of the compressed ultrafast imaging system 300, the fringe signal scene is imaged on the digital micromirror device 16, and is reflected by the digital micromirror device 16 to form a coded signal scene. After the coded signal scene passing through the sixth convex lens 15 and the fourth beam splitter 14 again, the coded signal scene is reflected by the fourth beam splitter 14 to enter the streak camera 17 to obtain a detection result. The streak camera 17 transmits the detection result to the computer 19 of the data processing system 500 for calculation and reconstruction.

Referring to FIG. 1, the nanosecond laser 1 of the light source and target system 100 is a single longitudinal mode nanosecond laser with a repetition frequency and external trigger operation mode, a width of a laser pulse generated by which is in the order of tens of nanoseconds, a wavelength of the laser pulse is in a visible light band, and a single pulse energy of the laser pulse is more than 1 mJ.

Figure 2:
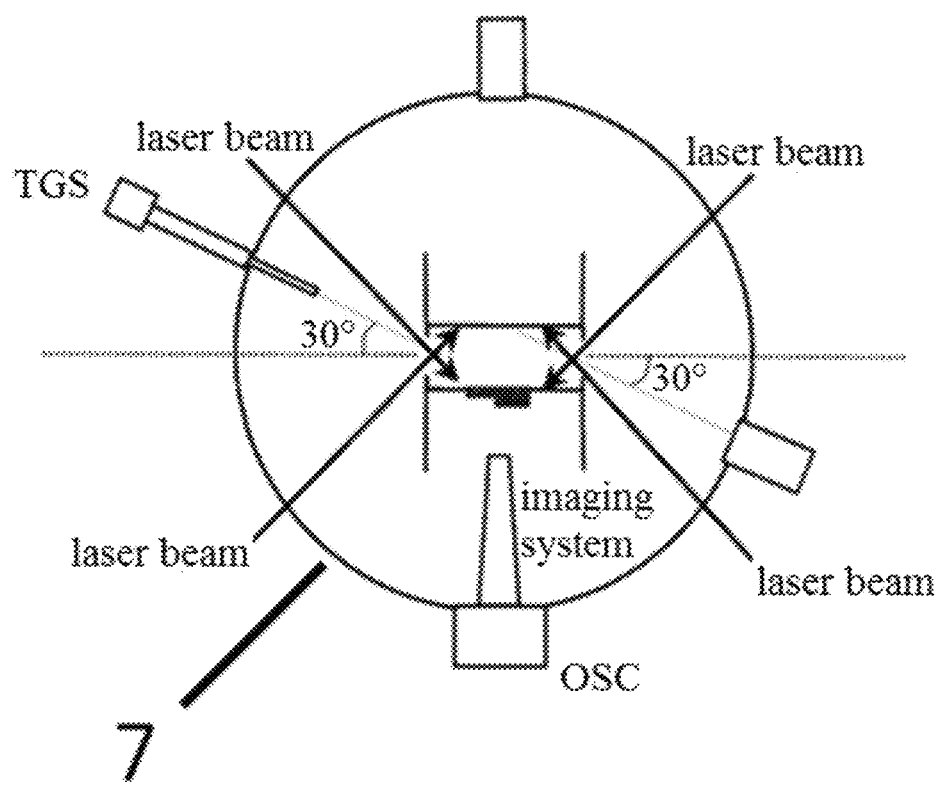
FIG. 2 is a structural schematic diagram of a spherical target chamber of a target.
Figure 3:
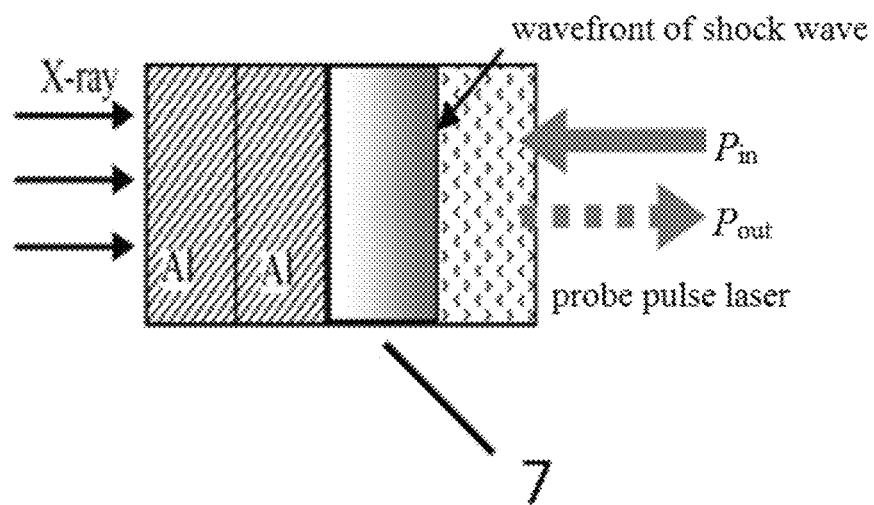
FIG. 3 is a structural schematic diagram of a "sandwich" target of the target.

Referring to FIGS. 1-3, the quartz glass sheet 6 of the light source and target system 100 can filter out a targeting remained laser at each frequency band in the target 7 well with a band-pass characteristic, thereby reducing an influence of the targeting remained laser on imaging.

Referring to FIGS. 1-3, the target 7 of the light source and target system 100 is a Shenguang III prototype device of the Laser fusion research center of Chinese Academy of Engineering Physics, with a laser inertial confinement fusion shock wave target and driving system, where the target is of a "sandwich" target structure, shock waves are generated by an implosion result from a laser ablation, and a probe pulse laser signal is reflected on a free surface of the shock wave to generate a Doppler frequency shift and become a signal scene with velocity information of a wavefront of the shock wave.

Referring to FIG. 1, the etalon interference system 200 is an unequal-arm Michelson interferometer, which converts wavefront velocity information of the shock wave on the surface of the target 7 in the light source and the target system 100 into an image change of the interference fringes via a beat frequency and an interference, and a precise measurement of different velocity intervals can be achieved by changing a relative delay between two arms.

Figure 4:
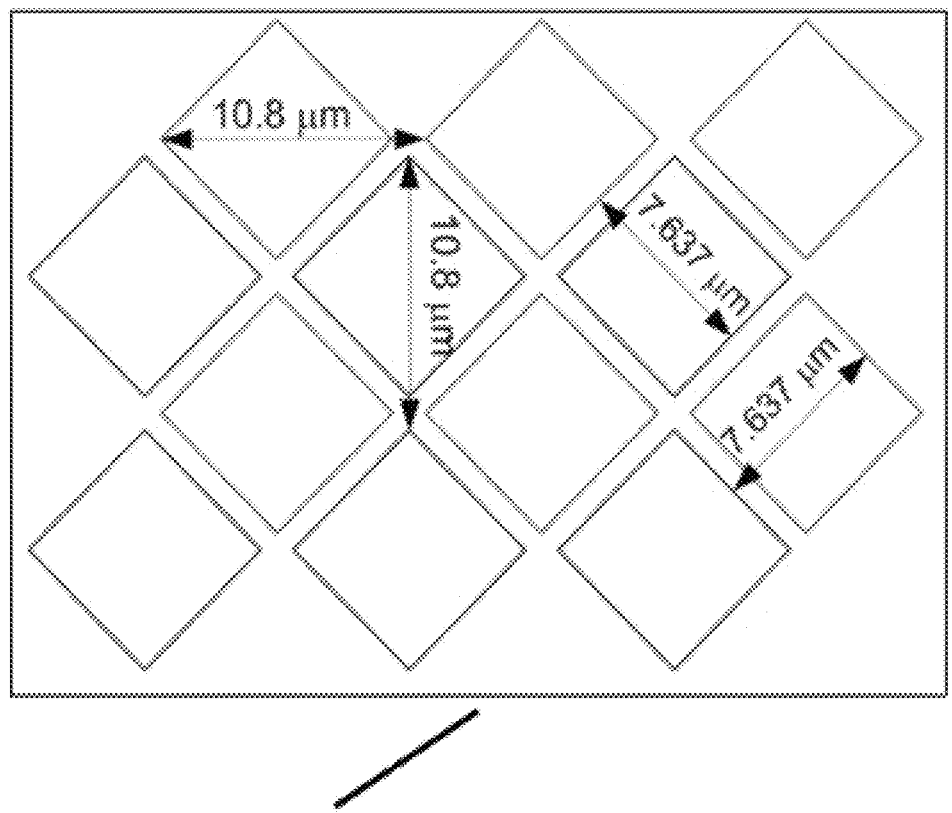
FIG. 4 is a structural plan schematic diagram of a digital micromirror device.
Figure 5:
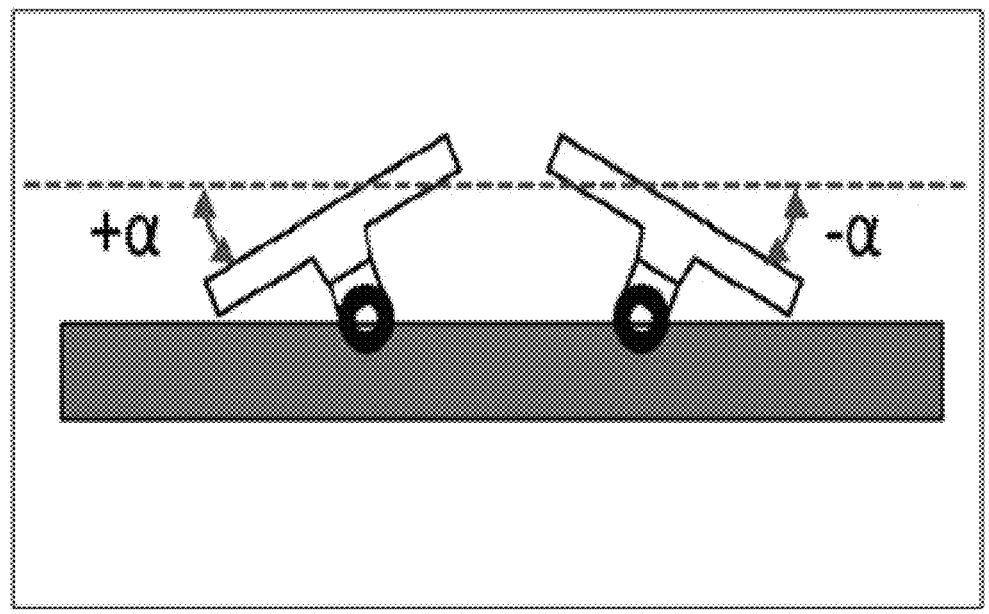
FIG. 5 is a schematic diagram showing a working principle of the digital micromirror device.

Referring to FIGS. 1, 4 and 5, the digital micromirror device 16 of the compressed ultrafast imaging system 300 is a digital micromirror device produced by Texas instruments, such as DLP Light craft 4500, for space encoding an interference fringe image. Wherein, each micromirror of the digital micromirror device 16 can be operated independently to selectively reflect lights at different positions of the interference fringes imaged on a surface of the digital micromirror device, to space encode the interference fringes. The digital micromirror device 16 can generate a random image code via a connected computer 19, or obtain an optimal code via a specific algorithm, such as a genetic algorithm or an annealing algorithm. In order to ensure that the interference fringe image measured on the streak camera 17 and the image code can reach the maximum definition simultaneously, the digital micromirror device 16 must be placed strictly on an image plane of an optical imaging system including the fifth convex lens 13, the fourth beam splitter 14 and the sixth convex lens 15.

Figure 6:
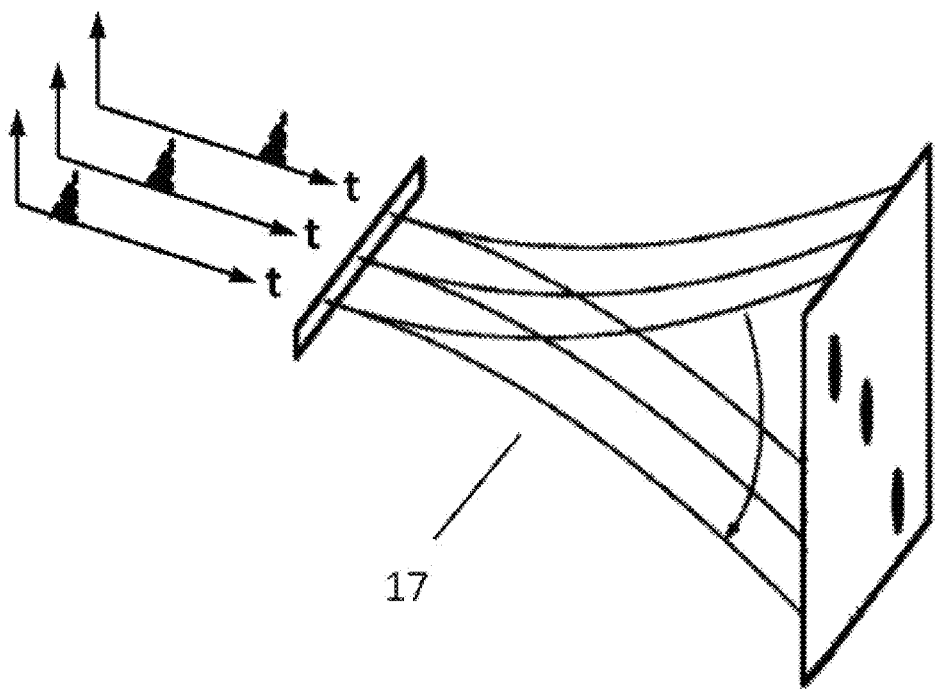
FIG. 6 is a schematic diagram showing a time-space transformation of a streak camera.

Referring to FIGS. 1 and 6, the streak camera 17 of the compressed ultrafast imaging system 300 can compress three-dimensional space-time information into two-dimensional space information via a "time-space" conversion, thereby completing a space-time compression and achieving an ultrafast target detection.

Referring to FIG. 1, the digital delay generator 18 of the timing control system 400 is DG645 produced by Stanford corporation or other similar products. The digital delay generator 18 is connected with the nanosecond laser 1 and the target 7 of the light source and target system 100, and the streak camera 17 of the compressed ultrafast imaging system 300 simultaneously, to precisely control a timing on the femtosecond order, and to compensate an inherent delay and a signal transmission delay of the system, so that each system can start to work when the laser arrives, thereby recording the complete signal to be measured.

Referring to FIG. 1, the computer 19 of the data processing system 500 is used to calculate and reconstruct a three-dimensional interference fringe image, and to calculate a shock wave velocity of laser inertial confinement fusion. A compressed sensing algorithm, such as an Augmented Lagrangian algorithm, is used in the calculation and reconstruction of the three-dimensional image, and a phase deconvolution algorithm, such as a flood algorithm, is mainly used in the calculation of the shock wave velocity, to ensure an accuracy and reliability of an experimental measurement result.

In order to make the objects, technical solutions and advantages of the present disclosure more apparent, the following detailed description of the present disclosure, including processes, conditions, experimental methods and the like for implementing the present disclosure, is made in combination with the accompanying drawings and embodiments, which are conventional knowledge and common general knowledge in the art except for those specifically mentioned below, and the present disclosure is not particularly limited thereto.

THE EMBODIMENTS

Figure 8:
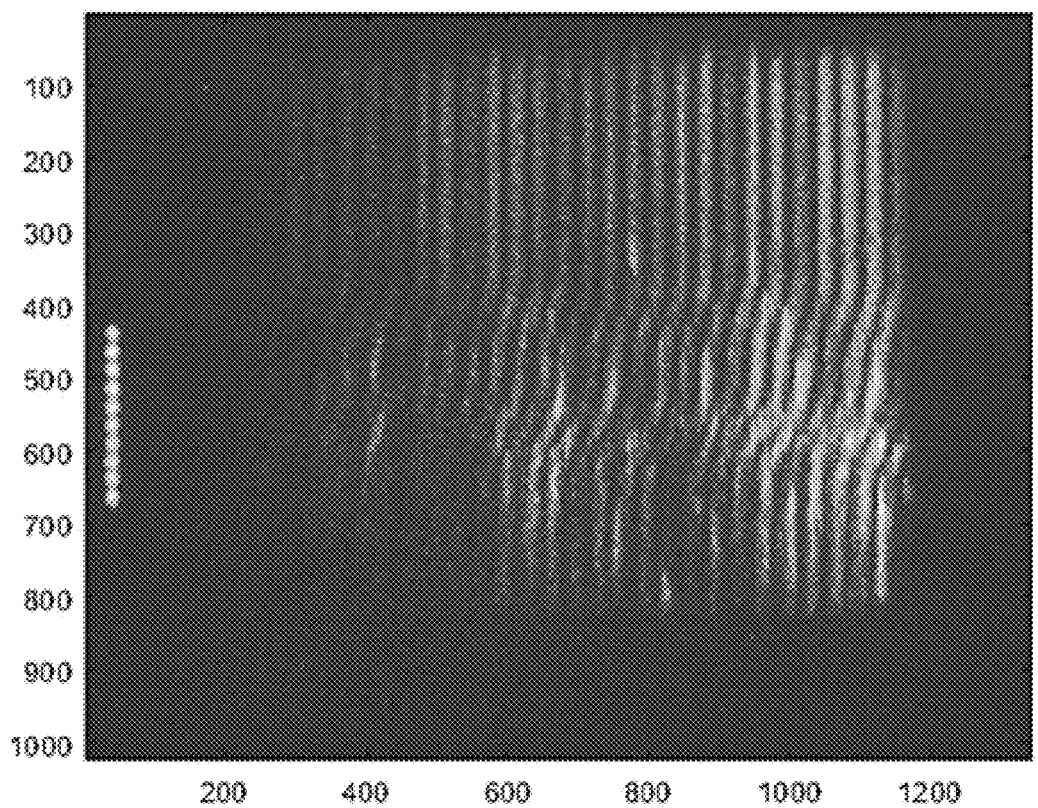
FIG. 8 shows an interference fringe image detected by a first embodiment of the present disclosure.
Figure 9:
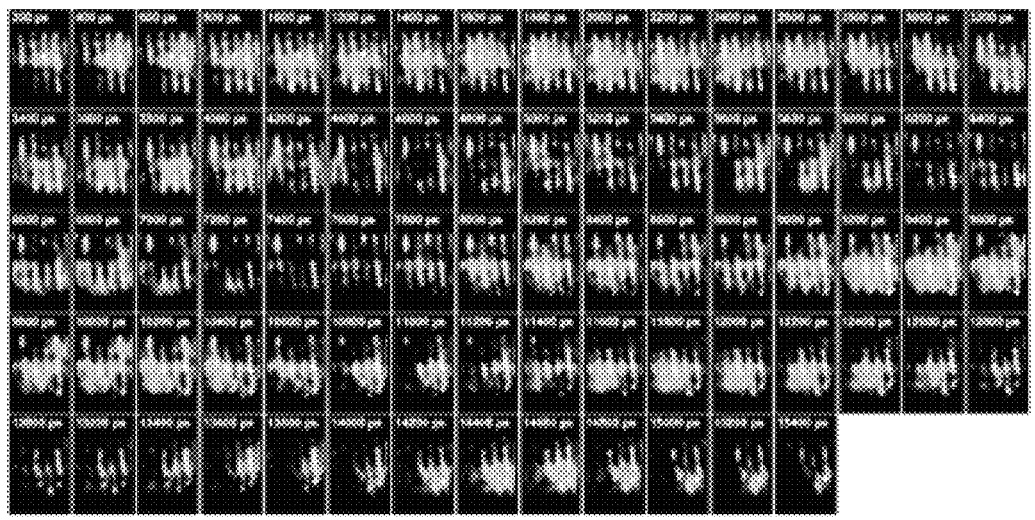
FIG. 9 shows multi-frame interference fringe images obtained from the interference fringe image shown in FIG. 8 by computational reconstruction.

Referring to FIGS. 1, 8 and 9, a nanosecond laser 1 of a light source and target system 100 generates a probe pulse laser signal with a pulse width of several tens of nanoseconds, a wavelength of 532 nm and a single pulse energy of more than 1 mJ. After the probe pulse laser signal being focused by a first convex lens 2, being transmitted by a first beam splitter 3, and passing through a second convex lens 4, a third convex lens 5 and a quartz glass plate 6, the probe pulse laser signal is imaged on a surface of a target 7. The target 7 absorbs energy under an ablation of an ultra-strong laser beam, and then implodes and generates shock waves propagating outwards. The probe pulse laser signal focused on the surface of the target 7 is reflected on a wavefront of the shock wave to form a signal scene. After the signal scene passing through the quartz glass plate 6, the third convex lens 5 and the second convex lens 4 again, the signal scene is reflected to a fourth convex lens 8 by the first beam splitter 3.

The signal scene is focused on a second beam splitter 9 of an etalon interference system 200 via the fourth convex lens 8 and is split into two beams by the second beam splitter 9, wherein one of the two beams is reflected for multiple times in an etalon 10 formed by two flat glasses or two quartz plates and then reaches the third beam splitter 12, the other of the two beams is directly reflected to the third beam splitter 12 by the holophote 11, and then the two beams irradiate at the same position of the third beam splitter 12 to generate interference fringes.

The interference fringes on the surface of the third beam splitter 12 are focused on a fourth beam splitter 14 by a fifth convex lens 13 of the compressed ultrafast imaging system 300, and are imaged on a surface of a digital micromirror device 16 after being transmitted by a sixth convex lens 15. The digital micromirror device 16 can generate image codes of random Bernoulli distribution with 0 and 1 accounting for 50% respectively under a control of a computer 19 of a data processing system 500. The interference fringes after space coding are focused on the fourth beam splitter 14 again via the sixth convex lens 15, and are reflected by the fourth beam splitter 14 to enter a streak camera 17. In the streak camera 17, a two-dimensional compressed image containing three-dimensional space-time information is finally obtained via a space-time compression, an interference fringe image shown in FIG. 8 is detected and is transmitted to the computer 19, to complete the whole detection process. In the whole detection process of the present disclosure, the digital delay generator 18 is simultaneously connected with the nanosecond laser 1, the target 7 and the streak camera 17, to control a timing accurately, to make all systems starting to work when the laser arrives. The acquired two-dimensional compressed image is calculated and reconstructed by the computer 19 to restore a complete dynamic process of the two-dimensional interference fringe image, and a plurality of interference fringe images shown in FIG. 9 are obtained via a computer reconstruction.

Referring to FIG. 2, FIG. 2 is a structural schematic diagram of a spherical target chamber of a target, wherein targeting lasers are injected into the spherical target chamber from different directions simultaneously, and the target is ablated by X-rays generated by interaction of the lasers and materials with a large atomic number.

Referring to FIG. 3, FIG. 3 is a structural schematic diagram of a "sandwich" target of the target, wherein a surface material of the "sandwich" target structure is rapidly heated to form plasmas under the ablation of X-rays, an absorbed energy is transmitted to a low-temperature high-density region, a temperature of a substance in the low-temperature high-density region is increased to millions of degrees Celsius after being heated, and a pressure thereof is increased to millions of atmospheric pressures, to achieve a high-temperature high-density state, so that a pellet target is driven to implode, to generate shock waves outwards. The probe pulse laser signal is reflected on a free surface of the shock wave to generate a Doppler frequency shift, and becomes a signal scene with velocity information of a wavefront of the shock wave.

Referring to FIG. 4, FIG. 4 is a structural plan schematic diagram of a digital micromirror device, wherein the digital micromirror device is mainly composed of diagonally arranged a large number of aluminum mirrors with micron-sized, and is integrated on a CMOS memory via a CMOS monolithic fabrication.

Referring to FIG. 5, FIG. 5 is a schematic diagram showing a working principle of the digital micromirror device, wherein each micromirror of the digital micromirror device can be independently controlled as an individual optical switch and can rotate between angles of positive a and negative a degrees. The rotation of the micromirror is controlled by an electrostatic attraction generated by a potential difference between the micromirror itself and the underlying memory unit. When the memory unit is in an "on" or "1" state, the micromirror is rotated to +α degrees; when the memory unit is in an "off" or "0" state, the micromirror is rotated to −α degrees. The interference fringes imaged on the surface of the digital micromirror device is selectively reflected by the digital micromirror device, so that the space coding of signals can be realized.

Referring to FIG. 6, FIG. 6 is a schematic diagram showing a time-space transformation of a streak camera, wherein a three-dimensional data containing time evolution information is converted into a two-dimensional image via the streak camera, i.e., time information is converted into space information, thereby a space-time compression can be completed. A space distribution of an optical signal about a duration and an intensity can be simultaneously obtained by using such instrument, to achieve a detection for an ultrafast target.

Figure 7:
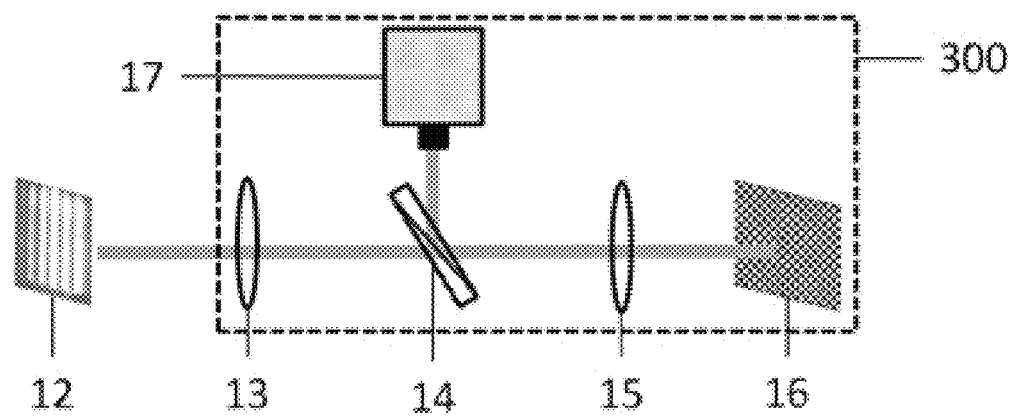
FIG. 7 is a schematic diagram showing a working principle of a compressed ultrafast imaging system.

Referring to FIG. 7, FIG. 7 is a schematic diagram showing a working principle of a compressed ultrafast imaging system, wherein the compressed ultrafast imaging system mainly includes the following four parts: interference fringes formed on the third beam splitter 12 of the etalon interference system 200 used as an object to be detected, an optical lens group consisting of the fifth convex lens 13, the fourth beam splitter 14 and the sixth convex lens 15 of the compressed ultrafast imaging system 300, the digital micromirror device 16, and the streak camera 17 of the data processing system 500.

The working process of the compressed ultrafast imaging system is as follows: the interference fringes formed on the third beam splitter 12 of the etalon interference system 200 as the object to be detected, are imaged on the surface of the digital micromirror device 16 via the optical lens group composed of the fifth convex lens 13, the fourth beam splitter 14 and the sixth convex lens 15; and the digital micromirror device 16 reflects lights at each pixel of the object according to the random Bernoulli distribution with 0 and 1 in a certain ratio under the control of the computer 19, to realize a space encoding of an image of the object. The encoded image of the object passes through the optical lens group again and enters the streak camera 17 to complete a time-space conversion, to obtain a compressed two-dimensional image containing the space-time information. Finally, a plurality of two-dimensional images containing time evolution information are calculated and reconstructed by the high-performance computer 19 with a compression sensing algorithm, such as the Augmented Lagrangian algorithm, to restore the complete dynamic process of the object.

Referring to FIG. 8, FIG. 8 shows an interference fringe image detected according to the first embodiment of the present disclosure.

Referring to FIG. 9, FIG. 9 shows multi-frame interference fringe images obtained from the interference fringe image shown in FIG. 8 by computer reconstruction.

In general, according to the compressed ultrafast imaging VISAR of the present disclosure, the compressed ultrafast photography technology is introduced as the optical detection means in the conventional imaging VISAR, the limitations of the existing linear imaging VISAR and planar imaging VISAR are broken through by performing the space coding, the data compression and the algorithm decoding on the dynamic information of the two-dimensional fringe image, and the complete dynamic information of the two-dimensional interference fringes image is obtained by the single shooting, and the measurement precision of the imaging VISAR is greatly improved.

The above description is intended to illustrate the preferred embodiments of the present disclosure and should not be taken as a limitation of the present disclosure. Any modification, equivalent and improvement made within the spirit and principle of the disclosure shall be included in the protection scope of the disclosure.

What is claimed is:

1. A compressed ultrafast imaging velocity interferometer system for any reflector, comprising a light source and target system (100), an etalon interference system (200), a compressed ultrafast imaging system (300), a timing control system (400) and a data processing system (500);

wherein, the light source and target system (100) comprises a nanosecond laser (1), a first convex lens (2), a first beam splitter (3), a second convex lens (4), a third convex lens (5), a quartz glass sheet (6), a target (7) and a fourth convex lens (8); wherein the nanosecond laser (1), the first convex lens (2) and the first beam splitter (3) are successively coupled on an optical path; a laser pulse generated by the nanosecond laser (1) passes through the first convex lens (2), is transmitted by the first beam splitter (3), then passes through the second convex lens (4), the third convex lens (5) and the quartz glass sheet (6), and then irradiates on the target (7) to form a signal scene via a reflection; the signal scene passes through the quartz glass sheet (6), the third convex lens (5), the second convex lens (4) again and then is reflected by the first beam splitter (3) to reach the fourth convex lens (8);

the etalon interference system (200) comprises a second beam splitter (9), an etalon (10), a holophote (11) and a third beam splitter (12); wherein an optical path is split into two paths by the second beam splitter (9), where the etalon (10) is coupled on one of the two paths, and the holophote (11) is coupled on another of the two paths; and the etalon (10) and the holophote (11) are respectively coupled with the third beam splitter (12) on an optical path;

the compressed ultrafast imaging system (300) comprises a fifth convex lens (13), a fourth beam splitter (14), a sixth convex lens (15), a digital micromirror device (16) and a streak camera (17); wherein the fifth convex lens (13) is coupled with the fourth beam splitter (14) on an optical path, and an optical path is split into two paths by the fourth beam splitter (14), wherein the sixth convex lens (15) and the digital micromirror device (16) are successively coupled on one of the two optical paths, and the streak camera (17) is coupled on another of the two optical paths, wherein the digital micromirror device (16) is placed on an image plane of an optical imaging system comprising the fifth convex lens (13), the fourth beam splitter (14) and the sixth convex lens (15);

the timing control system (400) comprises a digital delay generator (18);

the data processing system (500) comprises a computer (19) which is configured to calculate and reconstruct a three-dimensional interference fringe image, and to calculate a shock wave velocity of laser inertial confinement fusion, wherein a compressed sensing algorithm with an Augmented Lagrangian algorithm is used in the calculation and reconstruction of the three-dimensional interference fringe image, and a phase deconvolution algorithm with a flood algorithm is used in the calculation of the shock wave velocity;

the fourth convex lens (8) of the light source and target system (100) is coupled with the second beam splitter (9) of the etalon interference system (200) on an optical path;

the nanosecond laser (1) of the light source and target system (100) is electrically connected with the digital delay generator (18) of the timing control system (400);

the target (7) of the light source and target system (100) is electrically connected with the digital delay generator (18) of the timing control system (400);

the third beam splitter (12) of the etalon interference system (200) is coupled with the fifth convex lens (13) of the compressed ultrafast imaging system (300) on an optical path;

the streak camera (17) of the compressed ultrafast imaging system (300) is electrically connected with the digital delay generator (18) of the timing control system (400) and the computer (19) of the data processing system (500), respectively; and the digital micromirror device (16) of the compressed ultrafast imaging system (300) is electrically connected with the computer (19) of the data processing system (500), wherein, the digital delay generator (18) is connected with the nanosecond laser (1) and the target (7) of the light source and target system (100), and the streak camera (17) of the compressed ultrafast imaging system (300) simultaneously, to precisely control a timing on the femtosecond order, and to compensate an inherent delay and a signal transmission delay of the system, so that each system can start to work when the laser arrives so as to record the complete signal to be measured.

\* \* \* \* \*